P. P. FAZZARI.
AGRICULTURAL IMPLEMENT.
APPLICATION FILED SEPT. 15, 1919.

1,344,494.

Patented June 22, 1920.
3 SHEETS—SHEET 1.

Witnesses
Benj. Kahn

Inventor
Pietro P. Fazzari
By Victor J. Evans
Attorney

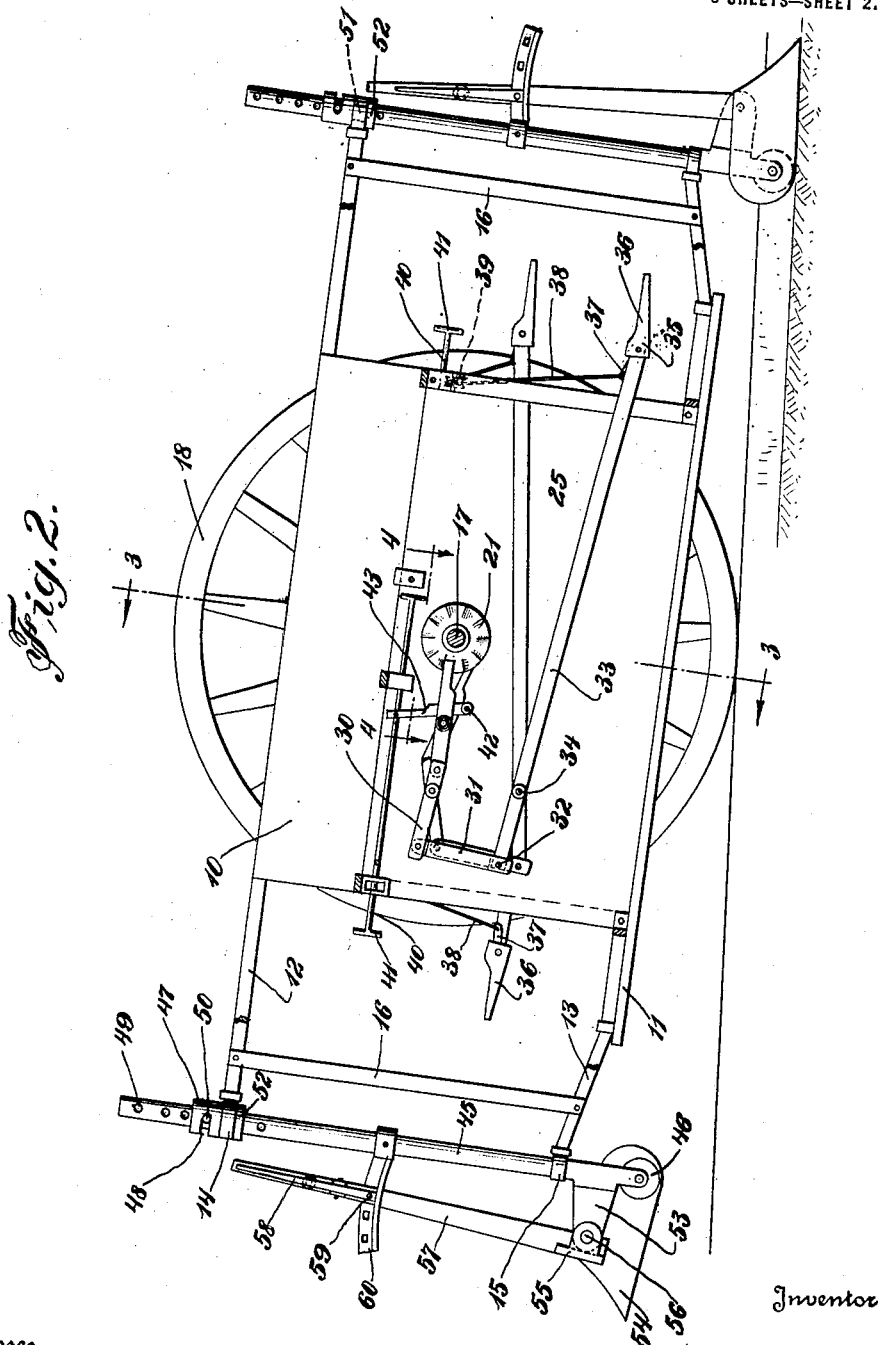

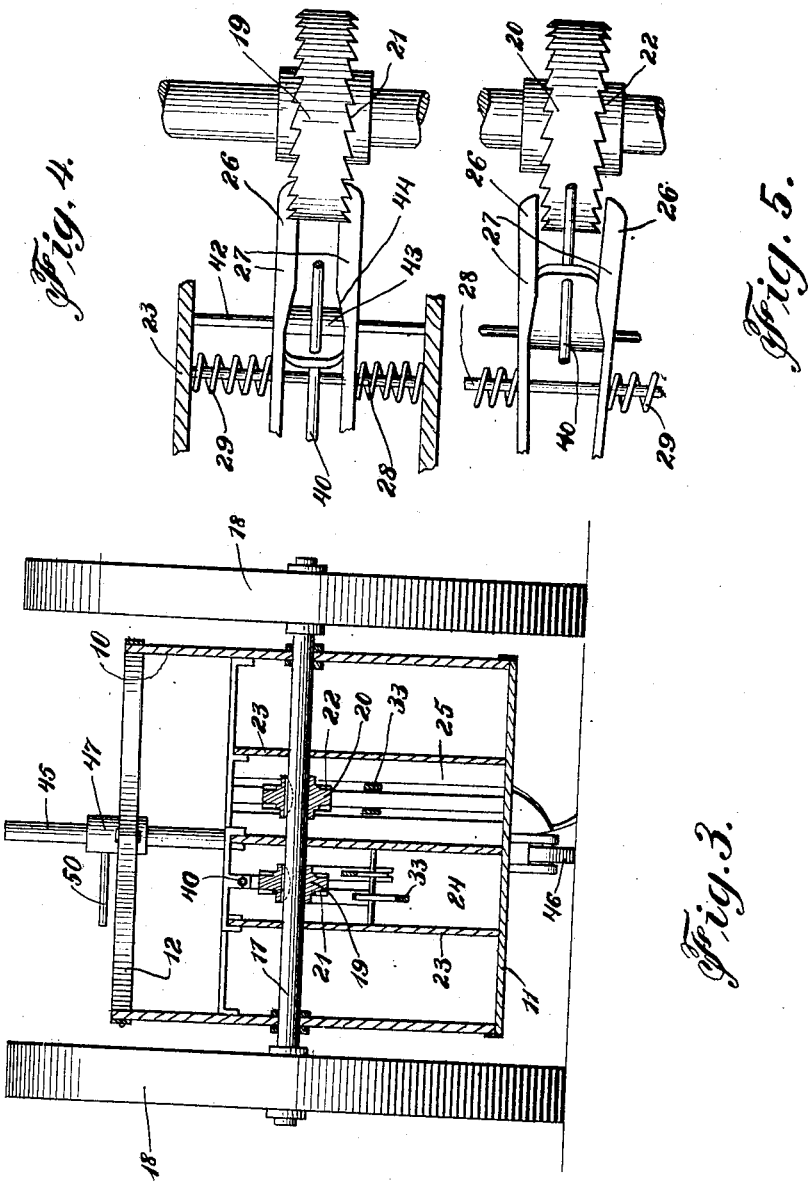

UNITED STATES PATENT OFFICE.

PIETRO PAOLO FAZZARI, OF HUNTINGTON, WEST VIRGINIA.

AGRICULTURAL IMPLEMENT.

1,344,494.           Specification of Letters Patent.     Patented June 22, 1920.

Application filed September 15, 1919. Serial No. 324,002.

*To all whom it may concern:*

Be it known that I, PIETRO PAOLO FAZZARI, a subject of the King of Italy, residing at Huntington, in the county of Cabell and State of West Virginia, have invented new and useful Improvements in Agricultural Implements, of which the following is a specification.

The present invention has reference to improvements in agricultural machines.

The primary object of the invention is to produce a manually operated wheeled agricultural machine, comprising a tiltable body carrying an implement at both ends thereof and having means at both of its said ends whereby the body may be propelled in opposite directions.

A further object of the invention is to produce an agricultural machine comprising a body supported on the shaft of a pair of wheels centrally arranged with respect to the body, means being provided at both ends of the machine for manually operating the shafts to turn the wheels in either of two directions, means being provided for releasing one of said shaft operating means when the other is in operative position, a vertically adjustable guide wheel supporting standard being arranged at each end of the body and each of said standards having removably and adjustably connected therewith an implement for tilling the soil, cutting grass, destroying weeds or the like.

It is a still further object of the invention to produce an agricultural machine comprising a tiltable body supported on the shaft or axle of the ground wheels of the device, said body having at its ends platforms which at their outer and central portions support vertically adjustable revolubly arranged standards each of which carry a guide wheel and each of which supporting an adjustable implement, pedal operated means being provided for turning the ground wheels in two directions, the pedals for operating the wheels in one direction being disposed at one end of the body over one of the platforms, the means for turning the ground wheels in a reverse direction being disposed over the second end platform, and means being arranged over both of the platforms for rendering the wheel operating means inactive from either platform.

It is a still further object of the invention to produce a foot pedal operated wheeled agricultural implement or machine which shall be of a comparatively cheap construction, and in which the full weight of the operator is imparted to the pedals so that the device is effectively operated at a minimum amount of physical exertion, and furthermore to produce a machine of this character having a reversely arranged implement on the opposite ends thereof and having simple means whereby the device may be reversely propelled as well as effectively guided in its travel.

Other objects and advantages will present themselves as the nature of the invention is better understood, reference being had to the accompanying drawings, in which:

Fig. 2 is a side elevation thereof.

Fig. 3 is a transverse sectional view approximately on the line 3—3 of Fig. 2.

Fig. 4 is a detail plan view, parts being in section and parts broken away illustrating the engagement of the dogs with one of the toothed wheels keyed upon the shaft for propelling the device in one direction.

Fig. 5 is a view similar to Fig. 4 but showing the manner of bringing the dogs out of engagement with the toothed wheel, as when the device is to be propelled in an opposite direction from that illustrated in Fig. 4.

Figure 1:
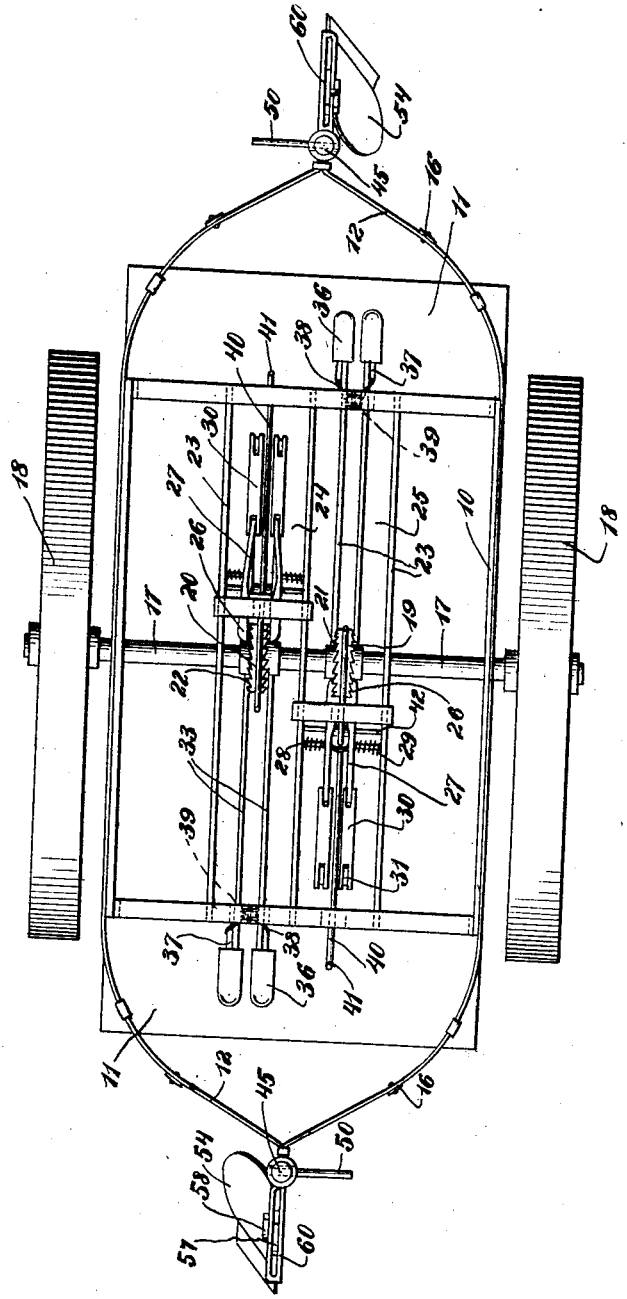
Figure 1 is a top plan view of the improvement.

As disclosed by the drawings, my improvement includes a substantially rectangular body portion of size and dimension best suited for the particular class of work to which the machine is adapted.

The body 10, in the construction illustrated by the drawings is partly open at the ends and top thereof, but it is to be understood that the top may be wholly closed and that the ends may be likewise closed except for openings therethrough through which pass the mechanism hereinafter described. When the body remains open a suitable removable cover may be provided therefor to protect the mechanism therein as well as to permit of the operation of the device under varying weather conditions.

The base of the body 10 extends a suitable distance beyond the ends thereof and the said projecting portions provide the ends of the body with platforms 11. Secured to the sides of the body at the upper and lower edges thereof as well as to the end platforms 11 are upper and lower rails 12 and 13 respectively. These rails are substantially U- shaped in plan and have their central portions provided with eyes 14 and 15 respectively which are preferably arranged in a line with each other. The rails 12 and 13, inward of the eyes 14 and 15 are braced by suitable uprights 16.

Journaled in transverse, centrally arranged bearings in the side members of the body 10, and extending a suitable distance from said bearings is a revoluble axle 17. On the outer ends of the axle 17 are the ground wheels 18 that are preferably provided with peripheral calks. The axle 17 is held against longitudinal movement in its bearings, and at points thereon equi-distant from the center thereof are keyed wheels 19 and 20 respectively, the said wheels, of course, being arranged in the body 10. Each of the wheels 19 and 20 has its opposite faces provided with crown teeth 21—21 and 22—22 respectively.

In the housing 10 there are arranged longitudinally extending partitions 23 providing housings or compartments 24 and 25 for the wheels 19 and 20 as well as for the actuating mechanism for said wheels.

The teeth of the wheels 19 and 20 are reversely directed, the said teeth, as disclosed in Fig. 4 of the drawings, providing oppositely disposed straight shoulders and angle walls between the shoulders, and the teeth of each of the wheels is designed to be engaged by the toothed ends 26 of a pair of dogs 27. The pairs of dogs 27 are reversely arranged, and each pair is approximately centrally pivoted to transversely disposed pins 28 in the respective compartments 24 and 25. Around the pins 28 and exerting a pressure between the partitions 23 and the outer faces of the dogs 27 are springs 29 which tend to force the dogs toward each other and the teeth 26 thereof in engagement with the teeth of the respective wheels 19 and 20.

Each pair of dogs 27 has at its outer end pivotally secured thereto a link 30 which in turn is pivotally connected to a depending link 31. These last mentioned links 31 may be provided with a series of apertures and through a desired one of the said apertures is passed a pivot 32 that connects the said link to a lever 33. It will be observed that one pair of levers is thus provided for each pair of operating dogs, and by reference to the drawings it will be seen that the levers are reversely directed through their respective compartments 24 and 25. The pairs of levers connected to the links and dogs which coöperate with the respective ground toothed wheels 19 and 20 are pivoted near their connections with the links 31. These pivots are indicated by the numerals 34 and are disposed transversely of the compartments 24 and 25 and connected to the partitions that form the side walls of the said compartments.

The ends of the housing 10 have suitable vertically disposed guideways therethrough for the pairs of levers 33, and on the outer ends of each pair of levers are pivoted as at 35 foot pedals 36. The pedals 36 have their under faces channeled or grooved to receive the ends of the levers 33 so that the said pedals are held against lateral or twisting movement, and connected to the pivot 35 of each of the pedals is a short link 37. Secured to the links of the coöperating pairs of pedals is a flexible element in the nature of a chain or cable 38 which is trained over a grooved wheel 39. Of course, one of the grooved wheels is arranged at one end of the housing, and by the provision thereof one of the pedals connected to one of each pair of coöperating levers will be raised as the other pedal and lever is lowered, and by a successive and alternate swinging of the coöperating pairs of levers the dogs coöperating with either of the toothed wheels 19 or 20 will cause the said wheel to turn and likewise turn the axle 17 and revolve the ground wheels 18. The upper rail 12 provides a support for the operator who places his feet on the pedal at one end of the device, and the weight of the operator will cause the body 10 to tilt on the axle 17 as illustrated in Fig. 2 of the drawings. The operator is thus in position to face the direction of travel of the machine. It will be apparent that the oppositely disposed pairs of levers 33 and the wheel operating mechanisms associated therewith will cause a binding by the pairs of dogs engaging with the oppositely toothed wheels 19 and 20 were not the dogs for one of the wheels released when the dogs for the second wheel are to operate thereon, and therefore I provide releasing mechanism for each pair of dogs. This mechanism includes a rod 40 extending through suitable bearings in each of the compartments 24 and 25, the said rods being oppositely directed and having their outer ends provided with handles 41. Below and between each pair of dogs 27 there is pivoted as at 42 a spreader member 43, and one of these spreader members is connected to one of the respective rods 40. By reference to Figs. 4 and 5 of the drawings it will be seen that the spreader members are reduced or gradually increased from the ends thereof connected to the rods 40 to their pivots 42, and likewise that the confronting inner faces of the dogs 27 are gradually widened from opposite points inward of their teeth 26, thus providing inclined shoulders 44 against which the inclined edges of the spreader members are designed to engage so that when a pull is exerted upon the rod 40 the dogs 27 will be swung away from each other and the teeth thereof brought out of engagement with the teeth of the respective crown toothed wheels 19 or 20. If desired, the rods 40 may project through both ends of the housing or body 10.

In the eyes 14 and 15 of the rail members 12 and 13 at each end of the device is a rotatable and vertically adjustable cross sectionally rounded standard 45. On the lower end of each of the standards 45 there is journaled a guide wheel 46, and loosely arranged on the upper portion of each of the standards and resting on the upper eye 40 of the rail members 12 is a collar 47. This collar is centrally provided with a notch or cut-away portion 48, and each of the standards 45 is provided with transverse apertures 49. Passing through the notch 48 in each of the collars 47 and through one of the apertures 49 in each of the standards 45 is an elongated pin 50. This pin in addition to holding the standard 45 vertically adjusted with respect to the body of the machine also serves as a handle member whereby the standard may be turned in its bearings to direct the guide wheel 46 and so steer the machine. The collar 47 is provided with a reduced sleeve extension 51 that passes through the eye 14 and the lower end of the said sleeve is provided with a shouldered flange 52 that rests upon the under face of the eye 14 so that the collar 47 while held against longitudinal movement through the eye is permitted a rotary movement thereon.

Each of the standards 45, above the guide wheel 46 is provided with an outstanding lug 53 and to this lug an implement 54 is secured. The implement may be in the nature of a share as disclosed by the drawings or in the nature of any other desired tool especially adapted for the class of work to be performed by the machine, and therefore the nature of the implement is not to be restricted. The implement, however, at the forward end thereof may be connected directly to the lug 53 by a plate 55 which is pivoted, as at 56, to the outer end of the lug, and from this plate there arises an arm 57. This arm has pivotally connected thereto a lever 58 carrying a dog or pawl 59 that is designed to engage with teeth or notches in a segmental plate 60 that is secured to and that extends outwardly from the respective standards 45. By this arrangement it may be seen that the point of the implement 54 may be regulated with respect to the ground surface on which it operates and it is thought, that from the foregoing description, when taken in connection with the drawings, the details of construction, operation and advantages of the improvement will be perfectly apparent to those skilled in the art to which such inventions appertain without further detailed description.

In this connection it is to be stated that the nature of the invention is such as to necessarily render the same susceptible to changes in size, proportion, material employed, etc., and that I am not to be restricted to the construction disclosed and herein described but am entitled to all such modifications and changes therefrom as fall within the scope of what I claim.

Having thus described the invention, what is claimed as new, is:—

1. In an occupant operated agricultural implement, a wheel supported tiltable body, vertically adjustable rotatably supported guide wheels at the ends of the body, foot pedals arranged in pairs at each end of the body inward of the guide wheels, and mechanism connected with said pedals and coöperating with the shaft of the ground wheels for turning said wheels in either of two directions to propel the body in either of such directions.

2. In an agricultural machine, ground wheels, an occupant operated axle therefor, a body tiltably supported on the axle, platforms at the ends of the body, vertically adjustable rotatably supported standards outward of the platforms, guide wheels carried thereby, foot pedals arranged in pairs above the platform, levers pivoted in the body and connected one to each of said pedals, flexible supporting means for each of said pedals, and mechanism connected with and actuated by the levers for turning the shaft and revolving the ground wheels in one of two directions in accordance with the operation of the pedals at either end of the body.

3. An occupant operated agricultural machine including a body having platforms at the ends thereof, and having upper and lower rails extending beyond the ends and platform, vertically adjustable rotatably supported standards on the rails, a guide wheel carried by each of said standards, an adjustably sustained pivotally secured implement on each of the standards, an axle journaled transversely of the body, ground wheels on the ends thereof, spaced crown wheels keyed on the axle, oppositely disposed spring influenced pairs of dogs coengaging with the teeth of the crown wheels, and said dogs being arranged in opposite directions in the body, oppositely directed pivoted levers projecting through the opposite ends of the body, a plurality of links connecting the levers and dogs, pivoted foot pedals on the respective pairs of levers, short links pivotally connected to said pedals, flexible supporting means between the links and body for the pedals, and spiral means operable from the opposite ends of the body designed to be forced between one pair of dogs to move the same out of engagement with one of the crown wheels.

In testimony whereof I affix my signature.

PIETRO PAOLO FAZZARI.